US012776973B2

(12) United States Patent
Yang

(10) Patent No.: US 12,776,973 B2
(45) Date of Patent: Oct. 27, 2026

(54) MEASUREMENT CONFIGURATION PROCESSING METHOD, AND APPARATUS

(71) Applicant: Beijing Xiaomi Mobile Software Co., Ltd., Beijing (CN)

(72) Inventor: Xing Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 48 days.

(21) Appl. No.: 18/857,394

(22) PCT Filed: Apr. 18, 2022

(86) PCT No.: PCT/CN2022/087520
§ 371 (c)(1),
(2) Date: Oct. 16, 2024

(87) PCT Pub. No.: WO2023/201502
PCT Pub. Date: Oct. 26, 2023

(65) Prior Publication Data
US 2025/0286795 A1 Sep. 11, 2025

(51) Int. Cl.
*H04L 43/062* (2022.01)
*H04W 24/10* (2009.01)

(52) U.S. Cl.
CPC .......... *H04L 43/062* (2013.01); *H04W 24/10* (2013.01)

(58) Field of Classification Search
CPC .... H04L 43/062; H04W 24/02; H04W 24/08; H04W 24/10; H04W 48/10; H04W 48/16; H04W 76/16; H04W 76/20; H04W 76/25; H04W 76/27; H04W 76/30; H04W 76/34;
(Continued)

(56) References Cited

U.S. PATENT DOCUMENTS

| | | | | |
|---|---|---|---|---|
| 11,553,365 | B2 * | 1/2023 | Kim | H04W 24/10 |
| 2018/0206138 | A1 * | 7/2018 | Hayashi | H04B 17/24 |
| 2018/0227972 | A1 * | 8/2018 | Tsuboi | H04W 8/00 |

(Continued)

FOREIGN PATENT DOCUMENTS

| | | |
|---|---|---|
| CN | 104396328 A | 3/2015 |
| CN | 108366378 A | 8/2018 |

(Continued)

OTHER PUBLICATIONS

"Correction in Quantity Configuration," Proceedings of the 3GPP TSG-RAN2 Meeting#64bis, LG Electronics Inc., R2-090471, Jan. 12, 2009, Ljubljana, Slovenia, 5 pages.

*Primary Examiner* — James N Fiorillo
(74) *Attorney, Agent, or Firm* — McCoy Russell LLP

(57) ABSTRACT

A measurement configuration processing method includes: receiving, by a terminal device, measurement configuration information sent by a network-side, where the measurement configuration information includes a quantity configuration; and determining a target access technology corresponding to the quantity configuration and a target measurement index identifier corresponding to the target access technology; and performing at least one of the following: deleting stored report information corresponding to the target measurement index identifier, or stopping the running of a report timer corresponding to the target measurement index identifier.

9 Claims, 3 Drawing Sheets

(58) Field of Classification Search
CPC ........... H04W 72/231; H04W 36/0061; H04W 36/245
USPC .......................................................... 709/224
See application file for complete search history.

(56) References Cited

U.S. PATENT DOCUMENTS

| | | | | |
|---|---|---|---|---|
| 2020/0100128 | A1* | 3/2020 | Fan | H04W 24/10 |
| 2020/0344627 | A1* | 10/2020 | Hong | H04W 24/08 |
| 2021/0014713 | A1* | 1/2021 | Xu | H04W 24/10 |
| 2021/0037435 | A1* | 2/2021 | Ahlström | H04W 24/02 |
| 2021/0084662 | A1* | 3/2021 | Zhang | H04W 72/542 |
| 2021/0306896 | A1* | 9/2021 | Wang | H04W 24/10 |
| 2022/0046456 | A1* | 2/2022 | Kumar | H04W 24/10 |
| 2022/0086855 | A1* | 3/2022 | Mallick | H04W 72/52 |
| 2022/0167453 | A1* | 5/2022 | Liu | H04W 76/15 |
| 2022/0264397 | A1* | 8/2022 | da Silva | H04W 36/00837 |
| 2022/0272539 | A1* | 8/2022 | Da Silva | H04W 12/108 |
| 2023/0109284 | A1* | 4/2023 | Zhou | H04W 48/16 370/329 |
| 2023/0189382 | A1* | 6/2023 | Haustein | H04W 24/10 370/329 |
| 2023/0247721 | A1* | 8/2023 | Kim | H04W 76/27 370/329 |
| 2024/0015549 | A1* | 1/2024 | Lunardi | H04W 24/10 |
| 2024/0032134 | A1* | 1/2024 | Kim | H04W 76/20 |
| 2024/0057199 | A1* | 2/2024 | Tsuboi | H04W 76/25 |
| 2024/0155397 | A1* | 5/2024 | Karabulut | H04W 48/16 |
| 2024/0406801 | A1* | 12/2024 | Ramachandra | H04W 24/10 |
| 2025/0133620 | A1* | 4/2025 | Liu | H04W 24/10 |
| 2025/0365594 | A1* | 11/2025 | Da Silva | H04W 24/10 |

FOREIGN PATENT DOCUMENTS

| | | | | |
|---|---|---|---|---|
| CN | 110022576 A | 7/2019 | | |
| CN | 110661600 A | 1/2020 | | |
| CN | 111148273 A | 5/2020 | | |
| CN | 113596875 A | 11/2021 | | |
| WO | WO-2020165751 A1 * | 8/2020 | | H04W 72/21 |
| WO | WO-2020190197 A1 * | 9/2020 | | H04W 76/27 |

* cited by examiner

MEASUREMENT CONFIGURATION PROCESSING METHOD, AND APPARATUS

CROSS REFERENCE TO RELATED APPLICATION

The present application is a U.S. National Stage of International Application No. PCT/CN2022/087520, filed on Apr. 18, 2022 the contents of all of which are incorporated herein by reference in their entireties for all purposes.

BACKGROUND OF THE INVENTION

In the related art, a terminal device performs measurements according to a measurement configuration of a network-side device.

SUMMARY OF THE INVENTION

In a first aspect, an example of the disclosure provides a measurement configuration processing method. The method is performed by a terminal device, and includes receiving measurement configuration information sent by a network-side device, where the measurement configuration information includes a quantity configuration; determining a target access technology corresponding to the quantity configuration and a target measurement index identifier corresponding to the target access technology; and deleting stored report information corresponding to the target measurement index identifier, and/or stopping a running of a report timer corresponding to the target measurement index identifier.

In a second aspect, an example of the disclosure provides another measurement configuration processing method. The method is performed by a network-side device, and includes sending measurement configuration information to a terminal device, where the measurement configuration information includes a quantity configuration, the quantity configuration is used to determine a target measurement index identifier corresponding to a target access technology, and the target measurement index identifier is used to determine deleted stored report information and/or a running-stopped report timer.

In a third aspect, an example of the disclosure provides a communication apparatus. The communication apparatus includes a processor and a memory, and a computer program is stored in the memory; and the processor executes the computer program stored in the memory, causing that the communication apparatus executes the above method in the first aspect.

In a fourth aspect, an example of the disclosure provides a communication apparatus. The communication apparatus includes a processor and a memory, and a computer program is stored in the memory; and the processor executes the computer program stored in the memory, causing that the communication apparatus executes the above method in the second aspect.

In a fifth aspect, an example of the disclosure provides a communication apparatus. The communication apparatus includes a processor and an interface circuit, the interface circuit is configured to receive a code instruction and transmit the code instruction to the processor, and the processor is configured to run the code instruction, causing that the apparatus executes the above method in the first aspect.

In a sixth aspect, an example of the disclosure provides a communication apparatus. The communication apparatus includes a processor and an interface circuit, the interface circuit is configured to receive a code instruction and transmit the code instruction to the processor, and the processor is configured to run the code instruction, causing that the apparatus executes the above method in the second aspect.

In a seventh aspect, an example of the disclosure provides a non-transitory computer readable storage medium, for storing instructions used by a terminal device, and when the instructions are executed, the terminal device executes the method in the first aspect.

In an eighth aspect, an example of the disclosure provides a non-transitory computer readable storage medium, for storing instructions used by a network-side device, and when the instructions are executed, the network-side device executes the method in the second aspect.

BRIEF DESCRIPTION OF DRAWINGS

In order to explain examples of the disclosure or the technical solution in the background art more clearly, accompanying drawings needing to be used in the examples of the disclosure or the background art are explained below.

DETAILED DESCRIPTION OF THE INVENTION

The disclosure relates to the technical field of communications, in particular to a measurement configuration processing method, and an apparatus.

Examples of the disclosure provide a measurement configuration processing method, and an apparatus. A terminal device may determine a reconfigured target access technology and a corresponding target measurement index identifier, then merely deletes stored report information corresponding to the target measurement index identifier and/or stops the running of a report timer corresponding to the target measurement index identifier, and a delay can be prevented from occurring when performing measurement report on a cell of an access technology, which is not reconfigured, among a plurality of access technologies supported by the terminal device.

In order to better understand a measurement configuration processing method, and an apparatus disclosed by examples of the disclosure, a communication system applicable to the examples of the disclosure is described first below.

Figure 1:
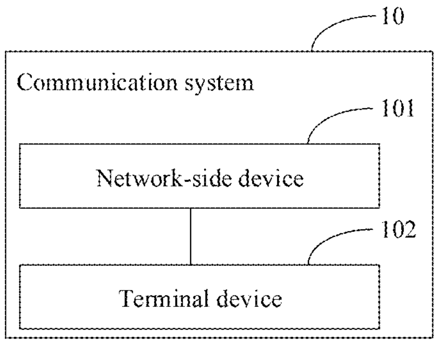
FIG. 1 is a framework diagram of a communication system provided by an example of the disclosure.

Please refer to FIG. 1, and FIG. 1 is a schematic framework diagram of a communication system provided by an example of the disclosure. The communication system may include but is not limited to a network-side device and a terminal device, the quantity and form of devices shown in FIG. 1 are merely illustrative but not constitute limitations on the example of the disclosure, and in actual applications, two or more than two network-side devices and two or more than two terminal devices may be included. The communication system shown in FIG. 1 including one network-side device 101 and one terminal device 102 is taken as an example.

It needs to be noted that the technical solution of the example of the disclosure may be applied to various communication systems. For example, a long term evolution (LTE) system, a 5th generation (5G) mobile communication system, a 5G new radio (NR) system, or other future new-type mobile communication systems, etc. It further needs to be noted that a side link in the example of the disclosure may further be called a sidelink or a through link.

The network-side device 101 in the example of the disclosure is an entity for transmitting or receiving a signal at a network side. For example, the network-side device 101 may be an evolved NodeB (eNB), a transmission reception point (TRP), a next generation NodeB (gNB) in an NR system, a network-side device in other future mobile communication systems or an access node in a wireless fidelity (WiFi) system, etc. Specific technologies and specific forms adopted in the network-side device are not limited in the example of the disclosure. The network-side device provided by the example of the disclosure may be composed of a central unit (CU) and a distributed unit (DU), CU may also be called a control unit, by adopting a CU-DU structure, the network-side device, for example, a protocol layer of the network-side device may be separated, functions of part of protocol layers are intensively controlled in the CU, and functions of remaining part or all protocol layers are distributed in the DU, and intensively controlled in the CU.

The terminal device 102 in the example of the disclosure is an entity for transmitting or receiving a signal at a user side, for example, a mobile phone. The terminal device may also be called a terminal, user equipment (UE), a mobile station (MS), a mobile terminal (MT), etc. The terminal device may be a car having a communication function, a smart car, a mobile phone, a wearable device, a pad, a computer with a wireless transceiving function, a virtual reality (VR) terminal device, an augmented reality (AR) terminal device, a wireless terminal device in industrial control, a wireless terminal device in self-driving, a wireless terminal device in a remote medical surgery, a wireless terminal device in a smart grid, a wireless terminal device in transportation safety, a wireless terminal device in a smart city, a wireless terminal device in a smart home, etc. The specific technologies and specific forms adopted in the terminal device are not limited in the example of the disclosure.

It needs to be noted that the technical solution of the example of the disclosure may be applied to various communication systems. For example, a long term evolution (LTE) system, a 5th generation (5G) mobile communication system, a 5G new radio (NR) system, or other future new-type mobile communication systems, etc. It further needs to be noted that a side link in the example of the disclosure may further be called a sidelink or a through link.

It may be understood that the communication system described in the example of the disclosure is intended to explain the technical solution of the example of the disclosure more clearly, and does not constitute limitations on the technical solution provided by the example of the disclosure. Those ordinarily skilled in the art may know that with evolution of a system framework and appearing of a new service scene, the technical solution provided by the example of the disclosure is also applicable for similar technical problems.

In the related technology, a measurement configuration of a network-side device received by a terminal device includes a quantity configuration, report information of a plurality of access technologies stored in a local variable (VarMeasReportList) will be deleted, and/or running of all report timers is stopped. In a case that a quantity configuration of a certain access technology among the plurality of access technologies is reconfigured for the terminal device merely in the measurement configuration sent by the network-side device, resulting in a delay occurring when performing measurement report on a cell of an access technology, which is not reconfigured, among the plurality of access technologies supported by the terminal device.

In the example of the disclosure, a target access technology corresponding to the quantity configuration in the measurement configuration sent by the network-side device may be identified, a target measurement index identifier corresponding to the target access technology is determined, further, in response to determining that report information in a second local variable (VarMeasReportList) is reconfigured, stored report information corresponding to the target measurement index identifier corresponding to the target access technology corresponding to the quantity configuration is merely deleted, and/or timing of a running report timer corresponding to the target measurement index identifier corresponding to the target access technology corresponding to the quantity configuration is stopped. A delay may be prevented from occurring when performing measurement report on a cell of an access technology, which is not reconfigured, among the plurality of access technologies supported by the terminal device.

Based on this, examples of the disclosure provide a measurement configuration processing method, and an apparatus, so as to solve the problems existing in the related art.

Figure 2:
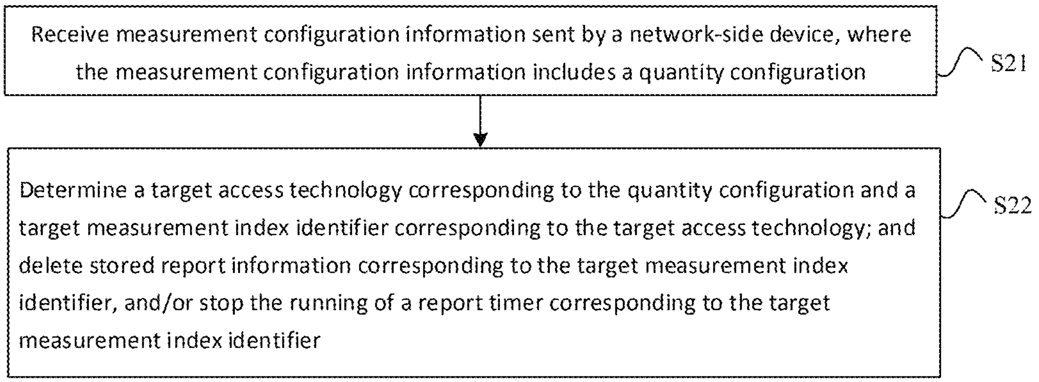
FIG. 2 is a flowchart of a measurement configuration processing method provided by an example of the disclosure.

Please refer to FIG. 2, and FIG. 2 is a flowchart of a measurement configuration processing method provided by an example of the disclosure.

As shown in FIG. 2, the method is performed by a terminal device, and the method may include but is not limited to steps S21 and S22.

In step S21: measurement configuration information sent by a network-side device is received, where the measurement configuration information includes a quantity configuration.

In the example of the disclosure, the measurement configuration information sent by the network-side device is received by the terminal device, where the measurement configuration information includes a measurement object, a report configuration (report config), a quantity configuration (quantity config), and a measurement index identifier (meas id), etc.

The measurement object indicates a frequency resource and a cell needing to be measured, and may include a plurality of access technologies, for example: a new radio (NR) access technology, a long term evolution (LTE), a universal terrestrial radio access (UTRA), and an evolved universal terrestrial radio access (E-UTRA). Each measurement object corresponds to one measurement object index identifier (measObject ID).

The report configuration is used to indicate types reported by the terminal device, including a report timer configuration, for triggering measurement report, and a report timer is, for example, T321, T322 and triggering time (timertotrigger). Different report configurations may be used for measurement objects of different access technologies, and each report configuration corresponds to one report configuration index identifier (reportconfig ID).

The network-side device will configure the measurement index identifier (meas id) for the terminal device, and the measurement object is combined with the report configuration through the measurement index identifier, such that a report manner of the measurement object may be determined by the terminal device. The measurement index identifier configured by the network-side device will be stored in a first local variable (VarMeasConfig) by the terminal device. In response to determining that the report configuration corresponding to a certain measurement index identifier is triggered, the terminal device will perform a measurement on the measurement object corresponding to the triggered measurement index identifier, so as to generate a measurement result and report the measurement result to the network-side device, and generate report information and store the report information in a second local variable (VarMeasReportList) according to the report configuration corresponding to the measurement index identifier. The report information includes a cell identifier whose report configuration is triggered for measurement report and the like.

In step S22: a target access technology corresponding to the quantity configuration and a target measurement index identifier corresponding to the target access technology are determined; and stored report information corresponding to the target measurement index identifier is deleted, and/or the running of a report timer corresponding to the target measurement index identifier is stopped.

In the example of the disclosure, the measurement configuration information sent by the network-side device is received by the terminal device, where the measurement configuration information includes the quantity configuration, and after receiving the quantity configuration, the terminal device may determine the corresponding target access technology according to the quantity configuration. The quantity configuration may be configured by the network-side device, or determined according to a communication protocol, or may further be preconfigured, etc.

It may be understood that the measurement result of the terminal device needs to be subjected to layer 3 filtering before being reported to the network-side device, meeting the following relationship:

$$Fn=(1-a)*F_{n-1}+a*M_n$$

$M_n$ is a latest measurement result of a current report number of times; $F_n$ is a result after filtering; and $F_{n-1}$ is a measurement result after last filtering.

The quantity configuration is used to determine a filtering parameter a, different filtering parameters a are used by different access technologies, in the example of the disclosure, after the filtering parameter a is determined according to the quantity configuration, the access technology corresponding to the filtering parameter a may be determined, such that the corresponding target access technology is determined.

In the example of the disclosure, the terminal device may determine the corresponding target access technology according to the parameter a of layer 3 filtering included in the quantity configuration.

The measurement configuration information sent by the network-side device is received by the terminal device, where the measurement configuration information includes the quantity configuration, and the terminal device determines the target access technology corresponding to the quantity configuration to be at least one of an NR, LTE, UTRA and E-UTRA or other access technologies according to the quantity configuration.

In the example of the disclosure, after determining the target access technology, the terminal device determines the target measurement index identifier according to the target access technology, and determines the target measurement index identifier through the access technology of the measurement object configuration or report configuration corresponding to the measurement index identifier stored in the local variable (VarMeasConfig).

Certainly, in the example of the disclosure, after determining the target access technology, the terminal device determines the target measurement index identifier according to the target access technology, a corresponding relationship between an access technology and a measurement index identifier may further be configured in advance for the terminal device, and after the target access technology is determined for the terminal device, the target measurement index identifier corresponding to the target access technology may be determined according to the target access technology and the corresponding relationship. The corresponding relationship between the access technology and the measurement index identifier may be configured in advance for the terminal device, may be configured by the network-side device, or through communication protocol stipulation, or may further be obtained from other terminal devices, etc.

Certainly, in the example of the disclosure, the measurement index identifier may further be configured in advance for the terminal device, the configured measurement index identifier corresponds to all access technologies, and after determining the target access technology, the terminal device may determine that the target measurement index identifier corresponding to the target access technology is the measurement index identifier configured in advance. The corresponding relationship between the access technology and the measurement index identifier may be configured in advance for the terminal device, may be configured by the network-side device, or through communication protocol stipulation, or may further be obtained from other terminal devices, etc.

In some examples, determining the target measurement index identifier corresponding to the target access technology includes: determining the target measurement index identifier corresponding to the target access technology according to the corresponding relationship between the access technology and the measurement index identifier.

It may be understood that in the example of the disclosure, the corresponding relationship between the access technology and the measurement index identifier configured in advance for the terminal device may be configured by the network-side device, or through communication protocol stipulation, or may further be obtained from other terminal devices, etc.

In this case, the terminal device may determine the target measurement index identifier corresponding to the target access technology according to the corresponding relationship between the access technology and the measurement index identifier and the determined target access technology.

In some examples, the corresponding relationship between the access technology and the measurement index identifier includes:

an access technology of a measurement object corresponding to the measurement index identifier; or an access technology of a report configuration corresponding to the measurement index identifier; or a corresponding relationship sent by the network-side device between an access technology and the measurement index identifier.

In a case that the corresponding relationship between the access technology and the measurement index identifier includes the access technology of the measurement object corresponding to the measurement index identifier, the corresponding relationship between the measurement index identifier and the access technology of the measurement object may be stored in the first local variable (VarMeasConfig) of the terminal device, and after determining the target access technology, the terminal device may determine the measurement object corresponding to the target access technology according to the corresponding relationship between the measurement index identifier and the access technology of the measurement object stored in the first local variable (VarMeasConfig), and further, determine the target measurement index identifier corresponding to the target access technology.

In a case that the corresponding relationship between the access technology and the measurement index identifier includes the access technology of the report configuration corresponding to the measurement index identifier, a corresponding relationship between the measurement index identifier and the access technology of the report configuration may be stored in the first local variable (VarMeasConfig) of the terminal device, and after determining the target access technology, the terminal device may determine the report configuration corresponding to the target access technology according to the corresponding relationship between the measurement index identifier and the access technology of the report configuration stored in the first local variable (VarMeasConfig), and further, determine the target measurement index identifier corresponding to the target access technology.

In a case that the corresponding relationship between the access technology and the measurement index identifier includes a corresponding relationship sent by the network-side device between the access technology and the measurement index identifier, a corresponding relationship sent by the network-side device between the access technology and the measurement index identifier is received by the terminal device, a list sent by the network-side device may be received, where the list includes at least one measurement index identifier, or include a measurement index identifier corresponding to at least one access technology, where the at least one access technology includes a target access technology.

It may be understood that in a case that at least one measurement index identifier is included in the list, the measurement index identifier indicated in the list corresponds to the access technology supported by the terminal device, and in a case that the terminal device supports a plurality of access technologies, the measurement index identifier indicated in the list corresponds to each access technology supported by the terminal device.

Based on this, the terminal device determines the target measurement index identifier corresponding to the target access technology as the measurement index identifier indicated in the list, and the terminal device deletes the stored report information corresponding to the target measurement index identifier, namely, deletes the stored report information corresponding to the measurement index identifier indicated in the list.

The list sent by the network-side device is received by the terminal device, where the measurement index identifier corresponding to at least one access technology is included in the list, and in a case that the at least one access technology includes the target access technology, the terminal device may determine the target measurement index identifier corresponding to the target access technology according to the target access technology and the measurement index identifier corresponding to the at least one access technology included in the list.

In a possible implementation, the list sent by the network-side device is received by the terminal device, at least one measurement index identifier is carried in the list, and the carried measurement index identifiers are measurement index identifiers needing to release the stored report information. The list sent by the network-side device is received by the terminal device, and it is determined that the target measurement index identifier corresponding to the target access technology is the measurement index identifier carried in the list.

In another possible implementation, the list sent by the network-side device is received by the terminal device, and all measurement index identifiers configured by the terminal device and the access technology corresponding to each measurement index identifier are carried in the list. After receiving the list sent by the network-side device, the terminal device may determine the target measurement index identifier matched with the target access technology according to the target access technology and all measurement index identifiers configured by the terminal device carried in the list and the access technology corresponding to each measurement index identifier.

In the example of the disclosure, in a case that the terminal device determines the target access technology and the target measurement index identifier corresponding to the target access technology, the report information corresponding to the target measurement index identifier may be selected to be deleted, thus, the received report information corresponding to target access technology corresponding to the quantity configuration is merely deleted by the terminal device, report information corresponding to other access technologies is retained, such that the processing complexity of the measurement configuration may be reduced, the terminal device merely needs to re-measure and report the target access technology corresponding to the quantity configuration, waste of radio resources may be avoided, when measurement report is performed on a cell of an access technology, which is not reconfigured, re-measurement is not needed, and a delay may be prevented from occurring when performing measurement report on the cell of the access technology, which is not reconfigured.

In the example of the disclosure, in a case that the terminal device determines the target access technology and the target measurement index identifier corresponding to the target access technology, the running of a report timer corresponding to the target measurement index identifier may be selected to be stopped. Thus, the processing complexity of the measurement configuration may be reduced, the terminal device merely performs stopping processing on the running of the report timer corresponding to the target access technology corresponding to the quantity configuration, and timing of the running of the report timer corresponding to other access technologies is not stopped, such that a delay may be prevented from occurring when performing measurement report on the cell of the access technology, which is not reconfigured, among the plurality of access technologies supported by the terminal device.

In the example of the disclosure, in a case that the terminal device determines the target access technology and the target measurement index identifier corresponding to the target access technology, the report information corresponding to the target measurement index identifier may be selected to be deleted, and the running of the report timer corresponding to target measurement index identifier may be selected to be stopped. Thus, the terminal device merely deletes the report information corresponding to target access technology corresponding to the quantity configuration, and merely performs stopping processing on the running of the report timer corresponding to the target access technology corresponding to the quantity configuration, the report information corresponding to other access technologies is retained, and timing of the running of the report timer corresponding to other access technologies is not stopped. Thus, the processing complexity of the measurement configuration may be reduced, the terminal device merely needs to re-measure and report the target access technology corresponding to the quantity configuration, waste of radio resources may be avoided, and a delay may be prevented from occurring when performing measurement report on the cell of the access technology, which is not reconfigured, among the plurality of access technologies supported by the terminal device.

For ease of understanding, an example of the disclosure provides an example.

In the example of the disclosure, measurement configuration information sent by a network-side device is received by a terminal device, the measurement configuration information includes a measurement object, a report configuration, a quantity configuration and a measurement index identifier, the terminal device correspondingly determines to support a plurality of access technologies NR, LTE, UTRA and E-UTRA according to indicated measurements, when the report configuration of the terminal device is triggered, report information respectively corresponding to the NR, LTE, UTRA and E-UTRA corresponding to the measurement index identifier is stored in a local variable, and the terminal device maintains a separate running report timer for each measurement index identifier for triggering measurement report corresponding to each measurement index identifier.

Based on this, the measurement configuration information sent by the network-side device is received again by the terminal device, the terminal device determines the target access technology corresponding to the quantity configuration to be NR, and the target measurement index identifier corresponding to the target access technology NR, report information corresponding to the target measurement index identifier in the report information respectively corresponding to the NR, LTE, UTRA and E-UTRA corresponding to the measurement index identifier last stored is merely deleted, and/or, the running of the report timer corresponding to the target measurement index identifier is merely stopped. Thus, the processing complexity of the measurement configuration may be reduced, the terminal device merely needs to re-measure and report the target access technology corresponding to the quantity configuration, waste of radio resources may be avoided, and a delay may be prevented from occurring when performing measurement report on other access technologies supported by the terminal device.

It needs to be noted that the above example is merely illustrative, and is not as a specific limitation on the example of the disclosure, and the terminal device correspondingly determines to support the plurality of access technologies according to the indicated measurement, may further include other access technologies other than the above example, or may further include part of the access technologies in the above example.

By implementing the example of the disclosure, the measurement configuration information sent by the network-side device is received by the terminal device, where the measurement configuration information includes the quantity configuration, and the target access technology corresponding to the quantity configuration and the target measurement index identifier corresponding to the target access technology are determined; and the stored report information corresponding to the target measurement index identifier is deleted, and/or, the running of the report timer corresponding to the target measurement index identifier is stopped. Thus, the processing complexity of the measurement configuration may be reduced, the terminal device merely needs to re-measure and report the target access technology corresponding to the quantity configuration, waste of radio resources may be avoided, and a delay may be prevented from occurring when performing measurement report on the cell of the access technology, which is not reconfigured, among the plurality of access technologies supported by the terminal device.

In some examples, deleting the report information corresponding to the target measurement index identifier includes: deleting report information stored in a second local variable and corresponding to the target measurement index identifier.

It may be understood that the measurement configuration information sent by the network-side device is received by the terminal device, the measurement configuration information includes the measurement object, the report configuration, the quantity configuration and the measurement index identifier, the terminal device correspondingly determines to support a plurality of access technologies NR, LTE, UTRA and E-UTRA according to the indicated measurements, when the report configuration of the terminal device is triggered, report information respectively corresponding to the NR, LTE, UTRA and E-UTRA corresponding to the measurement index identifier is stored in a second local variable (VarMeasReportList).

In the example of the disclosure, the measurement configuration information sent by the network-side device is received by the terminal device, the measurement configuration information includes the quantity configuration, and in a case that the target access technology corresponding to the quantity configuration and the target measurement index identifier corresponding to the target access technology are determined, the report information corresponding to the target measurement index identifier in the stored report information respectively corresponding to the NR, LTE, UTRA and E-UTRA corresponding to the measurement index identifier stored in the second local variable (VarMeasReportList) is merely deleted. Thus, the terminal device merely needs to re-measure and report the target access technology corresponding to the quantity configuration, and waste of radio resources may be avoided.

Figure 3:
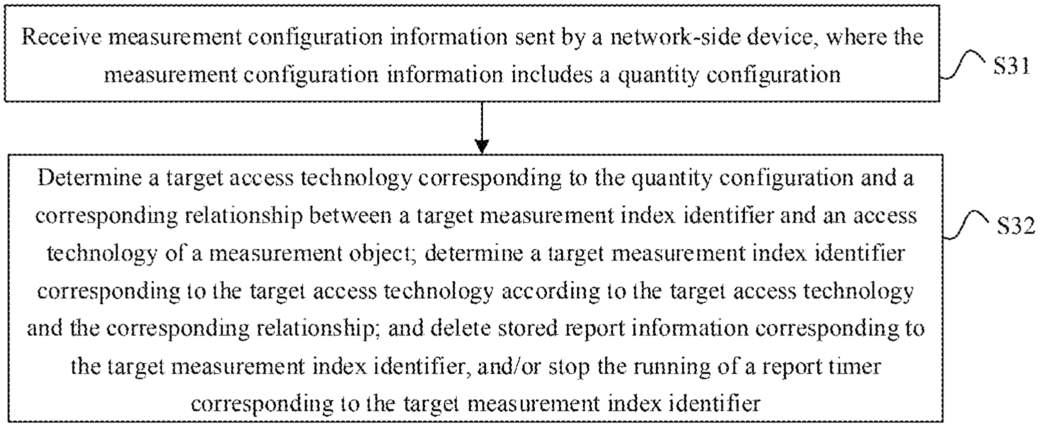
FIG. 3 is a flowchart of another measurement configuration processing method provided by an example of the disclosure.

Please refer to FIG. 3, and FIG. 3 is a flowchart of another measurement configuration processing method provided by an example of the disclosure.

As shown in FIG. 3, the method is performed by a terminal device, and may include but is not limited to steps S31 and S32.

In step S31: measurement configuration information sent by a network-side device is received, where the measurement configuration information includes a quantity configuration.

Detailed descriptions of S31 of the example of the disclosure may refer to related descriptions of S21 of the example of the disclosure, which is not repeated here.

In step S32: a target access technology corresponding to the quantity configuration is determined, and a corresponding relationship between a measurement index identifier and an access technology of a measurement object is determined; a target measurement index identifier corresponding to a target access technology is determined according to the target access technology and the corresponding relationship; and stored report information corresponding to the target measurement index identifier is deleted, and/or running of a report timer corresponding to the target measurement index identifier is stopped.

In the example of the disclosure, a method of the terminal device determining the target access technology corresponding to the quantity configuration may refer to related descriptions in the above example, which is not repeated here.

In the example of the disclosure, the corresponding relationship between the measurement index identifier and the access technology of the measurement object is stored in a first local variable (VarMeasReportList) of the terminal device, after determining the target access technology, the terminal device may determine a measurement object corresponding to the target access technology according to the corresponding relationship between the measurement index identifier and the access technology of the measurement object stored in the first local variable (VarMeasReportList), and further, the target measurement index identifier corresponding to the target access technology is determined.

In the example of the disclosure, in a case that the target access technology and the target measurement index identifier corresponding to the target access technology are determined, the terminal device may select to delete the report information corresponding to the target measurement index identifier, thus, the report information corresponding to the target access technology corresponding to the quantity configuration is merely deleted by the terminal device, the report information corresponding to other access technologies is retained, thus, the processing complexity of the measurement configuration may be reduced, the terminal device merely needs to re-measure and report the target access technology corresponding to the quantity configuration, waste of radio resources may be avoided, when measurement report is performed on a cell of the access technology, which is not reconfigured, re-measurement is not needed, and a delay may be prevented from occurring when performing measurement report on the cell of the access technology, which is not reconfigured.

In the example of the disclosure, in a case that the target access technology and the target measurement index identifier corresponding to the target access technology are determined, the terminal device may select to stop running of a report timer corresponding to the target measurement index identifier. Thus, the processing complexity of the measurement configuration may be reduced, the terminal device merely performs stopping processing on the running of the report timer corresponding to the target access technology corresponding to the quantity configuration, timing of the running of the report timer corresponding to other access technologies is not stopped, and thus, a delay may be prevented from occurring when performing measurement report on the cell of the access technology, which is not reconfigured, among the plurality of access technologies supported by the terminal device.

In the example of the disclosure, in a case that the target access technology and the target measurement index identifier corresponding to the target access technology are determined, the terminal device may select to delete the report information corresponding to the target measurement index identifier, and stop running of the report timer corresponding to the target measurement index identifier. Thus, the terminal device merely deletes the report information corresponding to the target access technology corresponding to the quantity configuration, and merely performs stopping processing on the running of the report timer corresponding to the target access technology corresponding to the quantity configuration, the report information corresponding to other access technologies is retained, and timing of running of the report timer corresponding to other access technologies is not stopped. Thus, the processing complexity of the measurement configuration may be reduced, the terminal device merely needs to re-measure and report the target access technology corresponding to the quantity configuration, waste of radio resources may be avoided, and a delay may be prevented from occurring when performing measurement report on the cell of the access technology, which is not reconfigured, among the plurality of access technologies supported by the terminal device.

Figure 4:
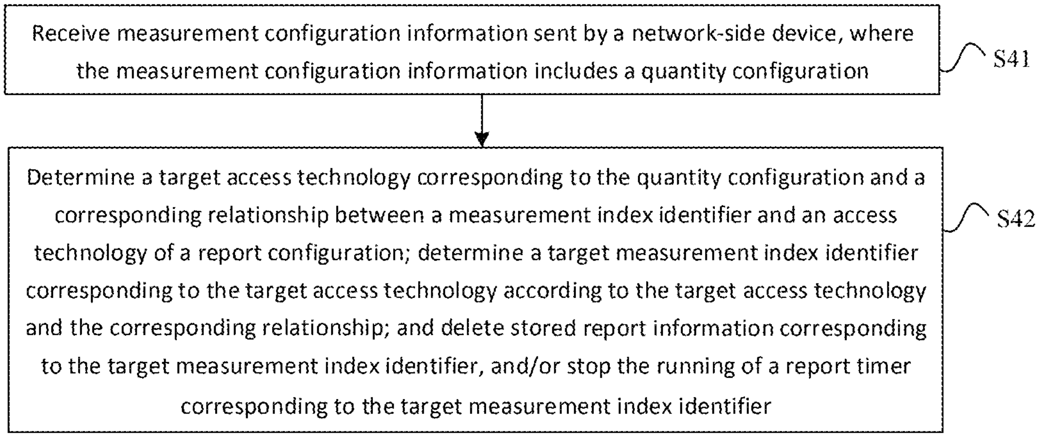
FIG. 4 is a flowchart of yet another measurement configuration processing method provided by an example of the disclosure.

Please refer to FIG. 4, and FIG. 4 is a flowchart of yet another measurement configuration processing method provided by an example of the disclosure.

As shown in FIG. 4, the method is performed by a terminal device, and may include but is not limited to steps S41 and S42.

In step S41: measurement configuration information sent by a network-side device is received, where the measurement configuration information includes a quantity configuration.

Detailed descriptions of S41 of the example of the disclosure may refer to related descriptions of S21 of the example of the disclosure, which is not repeated here.

In step S42: a target access technology corresponding to the quantity configuration is determined, and a corresponding relationship between a measurement index identifier and an access technology of a report configuration is determined; a target measurement index identifier corresponding to a target access technology is determined according to the target access technology and the corresponding relationship; and stored report information corresponding to the target measurement index identifier is deleted, and/or running of a report timer corresponding to the target measurement index identifier is stopped.

In the example of the disclosure, a method of the terminal device determining the target access technology corresponding to the quantity configuration may refer to related descriptions in the above example, which is not repeated here.

In the example of the disclosure, the corresponding relationship between the measurement index identifier and the access technology of the report configuration is stored in a first local variable (VarMeasReportList) of the terminal device, after determining the target access technology, the terminal device may determine a report configuration corresponding to the target access technology according to the corresponding relationship between the measurement index identifier and the access technology of the report configuration stored in the first local variable (VarMeasReportList), and further, the target measurement index identifier corresponding to the target access technology is determined.

In the example of the disclosure, in a case that the target access technology and the target measurement index identifier corresponding to the target access technology are determined, the terminal device may select to delete the report information corresponding to the target measurement index identifier, thus, the report information corresponding to the target access technology corresponding to the quantity configuration is merely deleted by the terminal device, the report information corresponding to other access technologies is retained, thus, the processing complexity of the measurement configuration may be reduced, the terminal device merely needs to re-measure and report the target access technology corresponding to the quantity configuration, waste of radio resources may be avoided, when measurement report is performed on a cell of the access technology, which is not reconfigured, re-measurement is not needed, and a delay may be prevented from occurring when performing measurement report on the cell of the access technology, which is not reconfigured.

In the example of the disclosure, in a case that the target access technology and the target measurement index identifier corresponding to the target access technology are determined, the terminal device may select to stop running of a report timer corresponding to the target measurement index identifier. Thus, the processing complexity of the measurement configuration may be reduced, the terminal device merely performs stopping processing on the running of the report timer corresponding to the target access technology corresponding to the quantity configuration, timing of the running of the report timer corresponding to other access technologies is not stopped, and thus, a delay may be prevented from occurring when performing measurement report on the cell of the access technology, which is not reconfigured, among the plurality of access technologies supported by the terminal device.

In the example of the disclosure, in a case that the target access technology and the target measurement index identifier corresponding to the target access technology are determined, the terminal device may select to delete the report information corresponding to the target measurement index identifier, and stop running of the report timer corresponding to the target measurement index identifier. Thus, the terminal device merely deletes the report information corresponding to the target access technology corresponding to the quantity configuration, and merely performs stopping processing on the running of the report timer corresponding to the target access technology corresponding to the quantity configuration, the report information corresponding to other access technologies is retained, and timing of running of the report timer corresponding to other access technologies is not stopped. Thus, the processing complexity of the measurement configuration may be reduced, the terminal device merely needs to re-measure and report the target access technology corresponding to the quantity configuration, waste of radio resources may be avoided, and a delay may be prevented from occurring when performing measurement report on the cell of the access technology, which is not reconfigured, among the plurality of access technologies supported by the terminal device.

Figure 5:
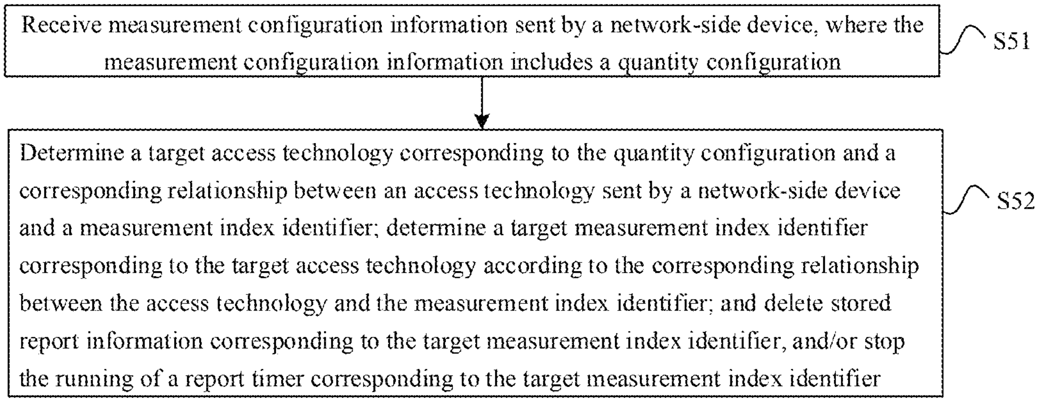
FIG. 5 is a flowchart of yet another measurement configuration processing method provided by an example of the disclosure.

Please refer to FIG. 5, and FIG. 5 is a flowchart of yet another measurement configuration processing method provided by an example of the disclosure.

As shown in FIG. 5, the method is performed by a terminal device, and may include but is not limited to steps S51 and S52.

In step S51: measurement configuration information sent by a network-side device is received, where the measurement configuration information includes a quantity configuration.

Detailed descriptions of S51 of the example of the disclosure may refer to related descriptions of S21 of the example of the disclosure, which is not repeated here.

In step S52: a target access technology corresponding to the quantity configuration is determined, and a corresponding relationship sent by the network-side device between an access technology and a measurement index identifier is received; a target measurement index identifier corresponding to a target access technology is determined according to the corresponding relationship between the access technology and the measurement index identifier; and stored report information corresponding to the target measurement index identifier is deleted, and/or, running of a report timer corresponding to the target measurement index identifier is stopped.

In the example of the disclosure, a method of the terminal device determining the target access technology corresponding to the quantity configuration may refer to related descriptions in the above example, which is not repeated here.

In the example of the disclosure, the corresponding relationship sent by the network-side device between the access technology and the measurement index identifier is received by the terminal device, a list sent by the network-side device may be received, where the list includes at least one measurement index identifier, or includes a measurement index identifier corresponding to at least one access technology, where the at least one access technology includes the target access technology.

The list sent by the network-side device is received by the terminal device, where in a case that the measurement index identifier is included in the list, the terminal device determines that the target measurement index identifier corresponding to the target access technology is the measurement index identifier in the list. In a case that a plurality of measurement index identifiers are included in the list, the terminal device determines that the target measurement index identifier corresponding to the target access technology is the plurality of measurement index identifiers in the list.

The list sent by the network-side device is received by the terminal device, the measurement index identifier corresponding to the at least one access technology is included in the list, and in a case that the at least one access technology includes the target access technology, the terminal device may determine the target measurement index identifier corresponding to the target access technology according to the target access technology and the measurement index identifier corresponding to the at least one access technology included in the list.

In the example of the disclosure, in a case that the target access technology and the target measurement index identifier corresponding to the target access technology are determined, the terminal device may select to delete the report information corresponding to the target measurement index identifier, thus, the terminal device merely deletes the report information corresponding to the target access technology corresponding to the quantity configuration, and the report information corresponding to other access technologies is retained. Thus, the processing complexity of the measurement configuration may be reduced, the terminal device merely needs to re-measure and report the target access technology corresponding to the quantity configuration, waste of radio resources may be avoided, when measurement report is performed on a cell of the access technology, which is not re-configured, re-measurement is not needed, and a delay may be prevented from occurring when performing measurement report on the cell of the access technology, which is not reconfigured.

In the example of the disclosure, in a case that the target access technology and the target measurement index identifier corresponding to the target access technology are determined, the terminal device may select to stop running of a report timer corresponding to the target measurement index identifier. Thus, the processing complexity of the measurement configuration may be reduced, the terminal device merely performs stopping processing on the running of the report timer corresponding to the target access technology corresponding to the quantity configuration, timing of the running of the report timer corresponding to other access technologies is not stopped, and thus, a delay may be prevented from occurring when performing measurement report on the cell of the access technology, which is not reconfigured, among the plurality of access technologies supported by the terminal device.

In the example of the disclosure, in a case that the target access technology and the target measurement index identifier corresponding to the target access technology are determined, the terminal device may select to delete the report information corresponding to the target measurement index identifier, and stop running of the report timer corresponding to the target measurement index identifier. Thus, the terminal device merely deletes the report information corresponding to the target access technology corresponding to the quantity configuration, and merely performs stopping processing on the running of the report timer corresponding to the target access technology corresponding to the quantity configuration, the report information corresponding to other access technologies is retained, and timing of running of the report timer corresponding to other access technologies is not stopped. Thus, the processing complexity of the measurement configuration may be reduced, the terminal device merely needs to re-measure and report the target access technology corresponding to the quantity configuration, waste of radio resources may be avoided, and a delay may be prevented from occurring when performing measurement report on the cell of the access technology, which is not reconfigured, among the plurality of access technologies supported by the terminal device.

Figure 6:
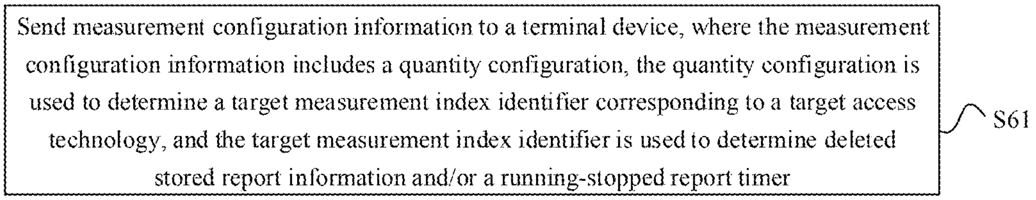
FIG. 6 is a flowchart of yet another measurement configuration processing method provided by an example of the disclosure.

Please refer to FIG. 6, and FIG. 6 is a flowchart of yet another measurement configuration processing method provided by an example of the disclosure.

As shown in FIG. 6, the method is performed by a terminal device, and may include but is not limited to step S61.

In step S61: measurement configuration information is sent to a terminal device, where the measurement configuration information includes a quantity configuration, the quantity configuration is used to determine a target measurement index identifier corresponding to a target access technology, and the target measurement index identifier is used to determine deleted stored report information and/or a running-stopped report timer.

In the example of the disclosure, the measurement configuration information sent by the network-side device is received by the terminal device, where the measurement configuration information includes a measurement object, a report configuration (report config), a quantity configuration (quantity config), and a measurement index identifier (meas id), etc.

The measurement object indicates a frequency resource and a cell needing to be measured, and may include a plurality of access technologies, for example: a new radio (NR) access technology, a long term evolution (LTE), a universal terrestrial radio access (UTRA), and an evolved universal terrestrial radio access (E-UTRA). Each measurement object corresponds to one measurement object index identifier (measObject ID).

The report configuration is used to indicate types reported by the terminal device, including a report timer configuration, for triggering measurement report, and a report timer is, for example, T321, T322 and triggering time (timertotrigger). Different report configurations may be used for measurement objects of different access technologies, and each report configuration corresponds to one report configuration index identifier (reportconfig ID).

The network-side device will configure the measurement index identifier (meas id) for the terminal device, and the measurement object is combined with the report configuration through the measurement index identifier, such that a report manner of the measurement object may be determined by the terminal device. The measurement index identifier configured by the network-side device will be stored in a first local variable (VarMeasConfig) by the terminal device. In response to determining that the report configuration corresponding to a certain measurement index identifier is triggered, the terminal device will perform a measurement on the measurement object corresponding to the triggered measurement index identifier, so as to generate a measurement result and report the measurement result to the network-side device, and generate report information and store the report information in a second local variable (VarMeasReportList) according to the report configuration corresponding to the measurement index identifier. The report information includes a cell identifier whose report configuration is triggered for measurement report and the like.

In the example of the disclosure, the measurement configuration information sent by the network-side device is received by the terminal device, where the measurement configuration information includes the quantity configuration, and after determining the quantity configuration, the terminal device may determine the corresponding target access technology according to related information of the access technology included in the quantity configuration. The related information of the access technology included in the quantity configuration may be configured by the network-side device, or determined according to a communication protocol, or may further be preconfigured, etc.

It may be understood that a measurement result of the terminal device needs to be subjected to layer 3 filtering before being reported to the network-side device, meeting the following relationship:

$$Fn = (1 - a) * F_{n-1} + a * M_n$$

$M_n$ is a latest measurement result of a current report number of times; $F_n$ is a result after filtering; and $F_{n-1}$ is a measurement result after last filtering.

The quantity configuration is used to determine a filtering parameter a, different filtering parameters a are used by different access technologies, in the example of the disclosure, after the filtering parameter a is determined according to the quantity configuration, the access technology corresponding to the filtering parameter a may be determined, such that the corresponding target access technology is determined.

In the example of the disclosure, the terminal device may determine the corresponding target access technology according to the parameter a of layer 3 filtering included in the quantity configuration.

The measurement configuration information sent by the network-side device is received by the terminal device, where the measurement configuration information includes the quantity configuration, and the terminal device determines the target access technology corresponding to the quantity configuration to be at least one of an NR, LTE, UTRA and E-UTRA or other access technologies according to the quantity configuration.

In the example of the disclosure, after determining the target access technology, the terminal device determines the target measurement index identifier according to the target access technology, a corresponding relationship between the access technology and the measurement index identifier may be configured in advance for the terminal device, and after determining the target access technology by the terminal device, the target measurement index identifier corresponding to the target access technology may be determined according to the target access technology and the corresponding relationship. The corresponding relationship between the access technology and the measurement index identifier configured in advance for the terminal device may be configured by the network-side device, or through communication protocol stipulation, or may further be obtained from other terminal devices, etc.

Certainly, in the example of the disclosure, the measurement index identifier may further be configured in advance for the terminal device, the configured measurement index identifier corresponds to all access technologies, and after determining the target access technology, the terminal device may determine that the target measurement index identifier corresponding to the target access technology is the measurement index identifier configured in advance. The corresponding relationship between the access technology and the measurement index identifier configured in advance for the terminal device may be configured by the network-side device, or through communication protocol stipulation, or may further be obtained from other terminal devices, etc.

In some examples, determining the target measurement index identifier corresponding to the target access technology includes: determining the target measurement index identifier corresponding to the target access technology according to the corresponding relationship between the access technology and the measurement index identifier.

It may be understood that in the example of the disclosure, the corresponding relationship between the access technology and the measurement index identifier configured in advance for the terminal device may be configured by the network-side device, or through communication protocol stipulation, or may further be obtained from other terminal devices, etc.

In this case, the terminal device may determine the target measurement index identifier corresponding to the target access technology according to the corresponding relationship between the access technology and the measurement index identifier and the determined target access technology.

In some examples, the corresponding relationship between the access technology and the measurement index identifier includes:

an access technology of a measurement object corresponding to the measurement index identifier; or an access technology of a report configuration corresponding to the measurement index identifier; or a corresponding relationship sent to the terminal device between an access technology and the measurement index identifier.

In a case that the corresponding relationship between the access technology and the measurement index identifier includes the access technology of the measurement object corresponding to the measurement index identifier, the corresponding relationship between the measurement index identifier and the access technology of the measurement object may be stored in the first local variable (VarMeasConfig) of the terminal device, and after determining the target access technology, the terminal device may determine the measurement object corresponding to the target access technology according to the corresponding relationship between the measurement index identifier and the access technology of the measurement object stored in the first local variable (VarMeasConfig), and further, determine the target measurement index identifier corresponding to the target access technology.

In a case that the corresponding relationship between the access technology and the measurement index identifier includes the access technology of the report configuration corresponding to the measurement index identifier, the corresponding relationship between the measurement index identifier and the access technology of the report configuration may be stored in the first local variable (VarMeasConfig) of the terminal device, and after determining the target access technology, the terminal device may determine the report configuration corresponding to the target access technology according to the corresponding relationship between the measurement index identifier and the access technology of the report configuration stored in the first local variable (VarMeasConfig), and further, determine the target measurement index identifier corresponding to the target access technology.

In a case that the corresponding relationship between the access technology and the measurement index identifier includes the corresponding relationship sent to the terminal device by the network-side device between the access technology and the measurement index identifier, the corresponding relationship sent by the network-side device between the access technology and the measurement index identifier is received by the terminal device, a list sent by the network-side device may be received, where the list includes at least one measurement index identifier, or include a measurement index identifier corresponding to at least one access technology, where the at least one access technology includes a target access technology.

It may be understood that in a case that at least one measurement index identifier is included in the list, the measurement index identifier indicated in the list corresponds to the access technology supported by the terminal device, and in a case that the terminal device supports a plurality of access technologies, the measurement index identifier indicated in the list corresponds to each access technology supported by the terminal device.

Based on this, the terminal device determines the target measurement index identifier corresponding to the target access technology as the measurement index identifier indicated, and the terminal device deletes the stored report information corresponding to the target measurement index identifier, namely, deletes the stored report information corresponding to the measurement index identifier indicated in the list.

The list sent by the network-side device is received by the terminal device, where the measurement index identifier corresponding to at least one access technology is included in the list, and in a case that the at least one access technology includes the target access technology, the terminal device may determine the target measurement index identifier corresponding to the target access technology according to the target access technology and the measurement index identifier corresponding to the at least one access technology included in the list.

In a possible implementation, the list sent by the network-side device is received by the terminal device, at least one measurement index identifier is carried in the list, and the carried measurement index identifiers are measurement index identifiers needing to release the stored report information. The list sent by the network-side device is received by the terminal device, and it is determined that the target measurement index identifier corresponding to the target access technology is the measurement index identifier carried in the list.

In another possible implementation, the list sent by the network-side device is received by the terminal device, and all measurement index identifiers configured by the terminal device and the access technology corresponding to each measurement index identifier are carried in the list. The terminal device may determine the target measurement index identifier corresponding to the target access technology according to the target access technology and all measurement index identifiers configured by the terminal device carried in the list and the access technology corresponding to each measurement index identifier.

In the example of the disclosure, in a case that the terminal device determines the target access technology and the target measurement index identifier corresponding to the target access technology, the report information corresponding to the target measurement index identifier may be selected to be deleted, thus, the received report information corresponding to target access technology corresponding to the quantity configuration is merely deleted by the terminal device, report information corresponding to other access technologies is retained, such that the processing complexity of the measurement configuration may be reduced, the terminal device merely needs to re-measure and report the target access technology corresponding to the quantity configuration, waste of radio resources may be avoided, when measurement report is performed on a cell of an access technology, which is not reconfigured, re-measurement is not needed, and a delay may be prevented from occurring when performing measurement report on the cell of the access technology, which is not reconfigured.

In the example of the disclosure, in a case that the terminal device determines the target access technology and the target measurement index identifier corresponding to the target access technology, the running of a report timer corresponding to the target measurement index identifier may be selected to be stopped. Thus, the processing complexity of the measurement configuration may be reduced, the terminal device merely performs stopping processing on the running of the report timer corresponding to the target access technology corresponding to the quantity configuration, and timing of the running of the report timer corresponding to other access technologies is not stopped, such that a delay may be prevented from occurring when performing measurement report on the cell of the access technology, which is not reconfigured, among the plurality of access technologies supported by the terminal device.

In the example of the disclosure, in a case that the terminal device determines the target access technology and the target measurement index identifier corresponding to the target access technology, the report information corresponding to the target measurement index identifier may be selected to be deleted, and the running of the report timer corresponding to target measurement index identifier may be selected to be stopped. Thus, the terminal device merely deletes the report information corresponding to target access technology corresponding to the quantity configuration, and merely performs stopping processing on the running of the report timer corresponding to the target access technology corresponding to the quantity configuration, the report information corresponding to other access technologies is retained, and timing of the running of the report timer corresponding to other access technologies is not stopped. Thus, the processing complexity of the measurement configuration may be reduced, the terminal device merely needs to re-measure and report the target access technology corresponding to the quantity configuration, waste of radio resources may be avoided, and a delay may be prevented from occurring when performing measurement report on the cell of the access technology, which is not reconfigured, among the plurality of access technologies supported by the terminal device.

For ease of understanding, an example of the disclosure provides an example.

In the example of the disclosure, measurement configuration information sent by a network-side device is received by a terminal device, the measurement configuration information includes a measurement object, a report configuration, a quantity configuration and a measurement index identifier, the terminal device correspondingly determines to support a plurality of access technologies NR, LTE, UTRA and E-UTRA according to indicated measurements, when the report configuration of the terminal device is triggered, report information respectively corresponding to the NR, LTE, UTRA and E-UTRA corresponding to the measurement index identifier is stored in a local variable, and the terminal device maintains a separate running report timer for each measurement index identifier for triggering measurement report corresponding to each measurement index identifier.

Based on this, the measurement configuration information sent by the network-side device is received again by the terminal device, the terminal device determines the target access technology corresponding to the quantity configuration to be NR, and the target measurement index identifier corresponding to the target access technology NR, report information corresponding to the target measurement index identifier in the report information respectively corresponding to the NR, LTE, UTRA and E-UTRA corresponding to the measurement index identifier last stored is merely deleted, and/or, the running of the report timer corresponding to the target measurement index identifier is merely stopped. Thus, the processing complexity of the measurement configuration may be reduced, the terminal device merely needs to re-measure and report the target access technology corresponding to the quantity configuration, waste of radio resources may be avoided, and a delay may be prevented from occurring when performing measurement report on other access technologies supported by the terminal device.

It needs to be noted that the above example is merely illustrative, and is not as a specific limitation on the example of the disclosure, and the terminal device correspondingly determines to support the plurality of access technologies according to the indicated measurement, may further include other access technologies other than the above example, or may further include part of the access technologies in the above example.

By implementing the example of the disclosure, the measurement configuration information sent by the network-side device is received by the terminal device, where the measurement configuration information includes the quantity configuration, and the target access technology corresponding to the quantity configuration and the target measurement index identifier corresponding to the target access technology are determined; and the stored report information corresponding to the target measurement index identifier is deleted, and/or, the running of the report timer corresponding to the target measurement index identifier is stopped. Thus, the processing complexity of the measurement configuration may be reduced, the terminal device merely needs to re-measure and report the target access technology corresponding to the quantity configuration, waste of radio resources may be avoided, and a delay may be prevented from occurring when performing measurement report on the cell of the access technology, which is not reconfigured, among the plurality of access technologies supported by the terminal device.

Figure 7:
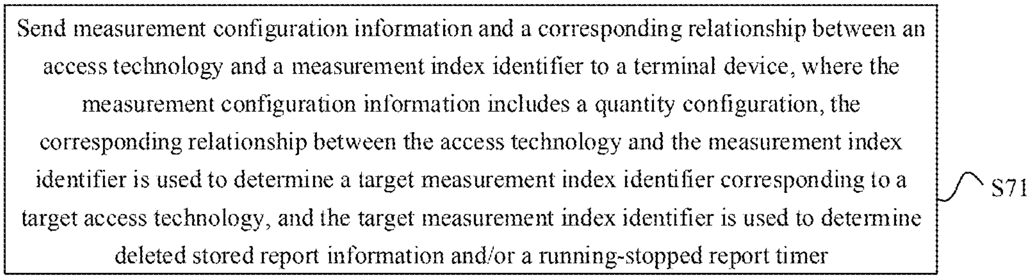
FIG. 7 is a flowchart of yet another measurement configuration processing method provided by an example of the disclosure.

Please refer to FIG. 7, and FIG. 7 is a flowchart of yet another measurement configuration processing method provided by an example of the disclosure.

As shown in FIG. 7, the method is performed by a network-side device, and may include but is not limited to step S71.

In step S71: measurement configuration information and a corresponding relationship between an access technology and a measurement index identifier are sent to a terminal device, where the measurement configuration information includes a quantity configuration, the corresponding relationship between the access technology and the measurement index identifier is used to determine a target measurement index identifier corresponding to a target access technology, and the target measurement index identifier is used to determine deleted stored report information and/or a running-stopped report timer.

In the example of the disclosure, the method of the terminal device determining the target access technology corresponding to the quantity configuration may refer to related descriptions in the above example, which is not repeated here.

In the example of the disclosure, the corresponding relationship between the access technology sent by the network-side device and the measurement index identifier is received by the terminal device, the list sent by the network-side device may be received, where at least one measurement index identifier is included in the list, or a measurement index identifier corresponding to at least one access technology, where the at least one access technology includes the target access technology.

The list sent by the network-side device is received by the terminal device, where in a case that the measurement index identifier is included in the list, the terminal device determines that the target measurement index identifier corresponding to the target access technology is the measurement index identifier in the list. In a case that a plurality of measurement index identifiers are included in the list, the terminal device determines that the target measurement index identifier corresponding to the target access technology is the plurality of measurement index identifiers in the list.

The list sent by the network-side device is received by the terminal device, the measurement index identifier corresponding to the at least one access technology is included in the list, and in a case that the at least one access technology includes the target access technology, the terminal device may determine the target measurement index identifier corresponding to the target access technology according to the target access technology and the measurement index identifier corresponding to the at least one access technology included in the list.

In the example of the disclosure, in a case that the target access technology and the target measurement index identifier corresponding to the target access technology are determined, the terminal device may select to delete the report information corresponding to the target measurement index identifier, thus, the terminal device merely deletes the report information corresponding to the target access technology corresponding to the quantity configuration, and the report information corresponding to other access technologies is retained. Thus, the processing complexity of the measurement configuration may be reduced, the terminal device merely needs to re-measure and report the target access technology corresponding to the quantity configuration, waste of radio resources may be avoided, when measurement report is performed on a cell of the access technology, which is not re-configured, re-measurement is not needed, and a delay may be prevented from occurring when performing measurement report on the cell of the access technology, which is not reconfigured.

In the example of the disclosure, in a case that the target access technology and the target measurement index identifier corresponding to the target access technology are determined, the terminal device may select to stop running of a report timer corresponding to the target measurement index identifier. Thus, the processing complexity of the measurement configuration may be reduced, the terminal device merely performs stopping processing on the running of the report timer corresponding to the target access technology corresponding to the quantity configuration, timing of the running of the report timer corresponding to other access technologies is not stopped, and thus, a delay may be prevented from occurring when performing measurement report on the cell of the access technology, which is not reconfigured, among the plurality of access technologies supported by the terminal device.

In the example of the disclosure, in a case that the target access technology and the target measurement index identifier corresponding to the target access technology are determined, the terminal device may select to delete the report information corresponding to the target measurement index identifier, and stop running of the report timer corresponding to the target measurement index identifier. Thus, the terminal device merely deletes the report information corresponding to the target access technology corresponding to the quantity configuration, and merely performs stopping processing on the running of the report timer corresponding to the target access technology corresponding to the quantity configuration, the report information corresponding to other access technologies is retained, and timing of running of the report timer corresponding to other access technologies is not stopped. Thus, the processing complexity of the measurement configuration may be reduced, the terminal device merely needs to re-measure and report the target access technology corresponding to the quantity configuration, waste of radio resources may be avoided, and a delay may be prevented from occurring when performing measurement report on the cell of the access technology, which is not reconfigured, among the plurality of access technologies supported by the terminal device.

In the example provided by the disclosure, the method provided by the example of the disclosure is described respectively from the perspective of the terminal device and the network-side device. In order to implement various functions in the method provided by the example of the disclosure, the network-side device and the terminal device may include a hardware structure and a software module, so as to implement the above various functions in a form of the hardware structure, the software module, or the hardware structure and the software module. A certain function of the above functions may be executed in a manner of the hardware structure, the software module, or the hardware structure and the software module.

Figure 8:
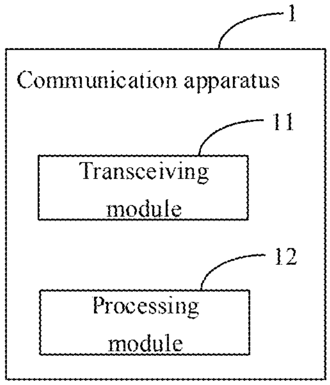
FIG. 8 is a structural diagram of a communication apparatus provided by an example of the disclosure.

Please refer to FIG. 8, which is a schematic structural diagram of a communication apparatus 1 provided by an example of the present application. The communication apparatus 1 shown in FIG. 8 may include a transceiving module 11 and a processing module 12. The transceiving module 11 may include a transmitting module and/or a receiving module, the transmitting module is configured to implement a transmitting function, the receiving module is configured to implement a receiving function, and the transceiving module 11 may implement a transmitting function and/or a receiving function.

The communication apparatus 1 may be a terminal device (for example, a first terminal device in the above-mentioned example of the method), may also be an apparatus in a terminal device, and may further be an apparatus capable of being matched with a terminal device for use. Alternatively, the communication apparatus 1 may be a network-side device, may also be an apparatus in a network-side device, and may further be an apparatus capable of being matched with a network-side device for use.

The communication apparatus 1 is the terminal device: the transceiving module 11 is configured to receive measurement configuration information sent by a network-side device, where the measurement configuration information includes a quantity configuration.

The processing module 12 is configured to determine a target access technology corresponding to the quantity configuration, and a target measurement index identifier corresponding to the target access technology; delete stored report information corresponding to the target measurement index identifier, and/or stop the running of a report timer corresponding to the target measurement index identifier.

In some examples, the processing module 12 is further configured to determine the target measurement index identifier corresponding to the target access technology according to a corresponding relationship between the target access technology and a measurement index identifier.

In some examples, the corresponding relationship between the access technology and the measurement index identifier includes:

- an access technology of a measurement object corresponding to the measurement index identifier; or
- an access technology of a report configuration corresponding to the measurement index identifier; or
- a corresponding relationship sent by the network-side device between an access technology and the measurement index identifier.

The communication apparatus 1 is the network-side device: the transceiving module 11 is configured to send measurement configuration information to the terminal device, where the measurement configuration information includes a quantity configuration, the quantity configuration is used to determine the target measurement index identifier corresponding to the target access technology, and the target measurement index identifier is used to determine the deleted stored report information and/or the running-stopped report timer.

In some examples, determining the target measurement index identifier corresponding to the target access technology includes: determining the target measurement index identifier corresponding to the target access technology according to the corresponding relationship between the access technology and the measurement index identifier.

In some examples, the corresponding relationship between the access technology and the measurement index identifier includes:

- an access technology of a measurement object corresponding to the measurement index identifier; or
- an access technology of a report configuration corresponding to the measurement index identifier; or
- a corresponding relationship sent to the terminal device between an access technology and the measurement index identifier.

For the communication apparatus 1 in the above example, specific manners of each module executing operations have been described in detail in the example of the method, which is not explained in detail here.

The communication apparatus 1 provided by the example of the disclosure has the same or similar beneficial effects as the communication method provided by some examples of the disclosure, which is not detailed here.

Figure 9:
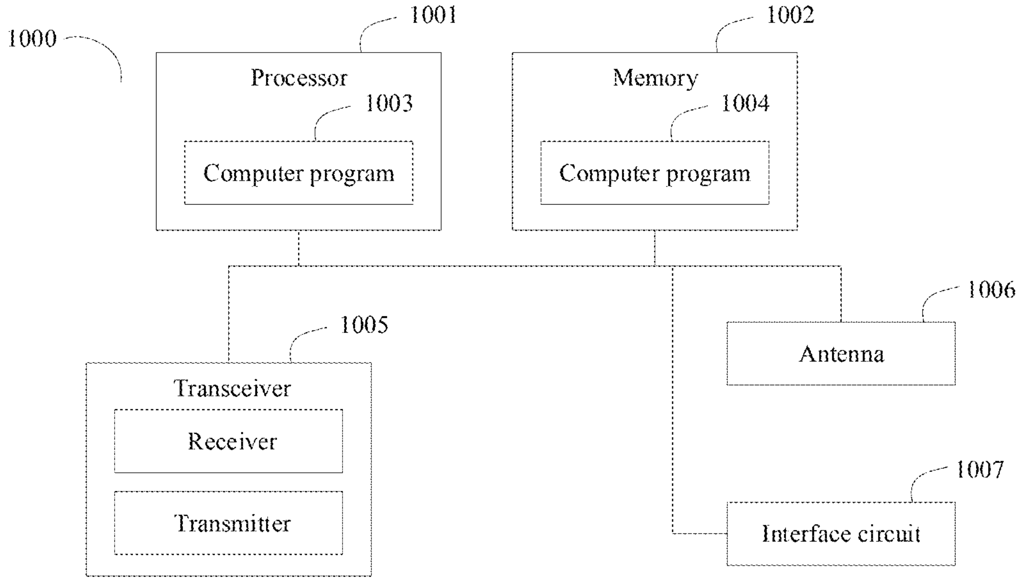
FIG. 9 is a structural diagram of another communication apparatus provided by an example of the disclosure.

Please refer to FIG. 9, and FIG. 9 is a schematic structural diagram of another communication apparatus 1000 provided by an example of the disclosure. The communication apparatus 1000 may be a network-side device, may also be a terminal device, may also be a chip, a chip system or a processor, etc. for supporting the network-side device to implement the above method, and may further be a chip, a chip system, or a processor, etc. for supporting the terminal device to implement the above method. The communication apparatus 1000 may be used to implement the method described in the example of the above method, and may specifically refer to the explanation in the example of the above method.

The communication apparatus 1000 may be a network-side device, may also be a terminal device, may also be a chip, a chip system or a processor, etc. for supporting the network-side device to implement the above method, and may further be a chip, a chip system, or a processor, etc. for supporting the terminal device to implement the above method. The apparatus may be used to implement the method described in the example of the above method, and may specifically refer to the explanation in the example of the above method.

The communication apparatus 1000 may include one or more processors 1001. The processor 1001 may be a general-purpose processor or a dedicated processor, etc. For example, it may be a baseband processor or a central processor. The baseband processor may be used to process communication protocols and communication data, and the central processor may be used to control communication apparatuses (such as a base station, a baseband chip, a terminal device, a terminal device chip, a DU or a CU, etc.), execute computer programs, and process data of the computer programs.

In some examples, the communication apparatus 1000 may further include one or more memories 1002, on which a computer program 1004 is stored, and the memory 1002 executes the computer program 1004, such that the communication apparatus 1000 executes the method described in the example of the above method. In some examples, data may further be stored in the memory 1002. The communication apparatus 1000 and the memory 1002 may be arranged separately, and may also be integrated together.

In some examples, the communication apparatus 1000 may further include a transceiver 1005 and an antenna 1006. The transceiver 1005 may be called a transceiving unit, a transmitter receiver or a transceiving circuit, etc. for implementing a transceiving function. The transceiver 1005 may include a receiver and a transmitter, and the receiver may be called a receiving machine or a receiving circuit, etc., for implementing a reception function; and the transmitter may be called a transmitting machine or a transmitting circuit, etc., for implementing a transmitting function.

In some examples, the communication apparatus 1000 may further include one or more interface circuits 1007. The interface circuit 1007 is used to receive a code instruction and transmit the code instruction to the processor 1001. The processor 1001 operates the code instruction to cause the communication apparatus 1000 to execute the method described in the example of the above method.

The communication apparatus 1000 is the terminal device: the transceiver 1005 is used to execute S21 in FIG. 2, S31 in FIG. 3, S41 in FIG. 4, and S51 in FIG. 5; and the processor 1001 is used to execute S22 in FIG. 2, S32 in FIG. 3, S42 in FIG. 4, and S52 in FIG. 5.

The communication apparatus 1000 is the network-side device: the transceiver 1005 is used to execute S61 in FIGS. 6 and S71 in FIG. 7.

In an implementation, the processor 1001 may include a transceiver for implementing receiving and transmitting functions. For example, the transceiver may be a transceiving circuit, or an interface, or an interface circuit. The transceiving circuit, the interface, or the interface circuit for implementing the receiving and transmitting functions may be separated, and may also be integrated together. The above transceiving circuit, the interface, or the interface circuit may be used for reading and writing of codes/data, or, the above transceiving circuit, the interface, or the interface circuit may be used for transmitting or transferring signals.

In an implementation, the processor 1001 may store a computer program 1003, and the computer program 1003 operates on the processor 1001, causing that the communication apparatus 1000 executes the method described in the example of the above method. The computer program 1003 may be solidified in the processor 1001, and in this case, the processor 1001 may be implemented by hardware.

In an implementation, the communication apparatus 1000 may include a circuit, and the circuit may implement functions of transmitting or receiving or communicating in the example of the above-mentioned method. The processor and the transceiver described in the disclosure may be implemented on an integrated circuit (IC), an analog IC, a radio frequency integrated circuit (RFIC), a mixed signal IC, an application specific integrated circuit (ASIC), a printed circuit board (PCB), an electronic device, etc. The processor and the transceiver may be manufactured by various IC processes, for example, a complementary metal oxide semiconductor (CMOS), an nMetal-oxide-semiconductor (NMOS), a positive channel metal oxide semiconductor (PMOS), a bipolar junction transistor (BJT), bipolar CMOS (BiCMOS), silicon germanium (SiGe), gallium arsenide (GaAs), etc.

The communication apparatus in the description in the above example may be a terminal device, but the scope of the communication apparatus described in the disclosure is not limited to this, and the structure of the communication apparatus is not limited by FIG. 9. The communication apparatus may be a separate device or may be a part of a larger device. For example, the communication apparatus may be:

(1) a separate integrated circuit IC, or a chip, or a chip system or a subsystem;

(2) a set having one or more ICs, and in some examples, the IC set may also include a storage component for storing data and computer programs;

(3) an ASIC, for example, a modem;

(4) a module capable of being embedded into other devices;

(5) a receiving machine, a terminal device, an intelligent terminal device, a cell phone, a wireless device, a hand-held machine, a moving unit, a mobile unit, a network device, a cloud device, an artificial intelligence device, etc.;

(6) others, and the like.

Figure 10:
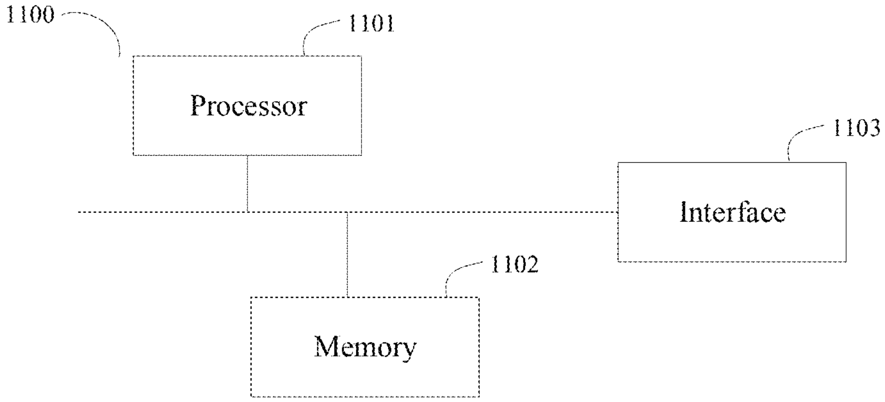
FIG. 10 is a structural schematic diagram of a chip provided by an example of the disclosure.

In a case that the communication apparatus may be a chip or a chip system, please refer to FIG. 10, which is a structural diagram of a chip provided by an example of the disclosure.

The chip 1100 includes a processor 1101 and an interface 1103. The quantity of the processor 1101 may be one or more, and the quantity of the interface 1103 may be more.

In a case that the chip is used to implement functions of the terminal device in the example of the disclosure:

the interface 1103 is used to receive code instructions and transmit the code instructions to the processor.

The processor 1101 is used to operate the code instructions so as to execute the measurement configuration processing methods of some examples above.

In a case that the chip is used to implement functions of the network-side device in the example of the disclosure:

the interface 1103 is used to receive code instructions and transmit the code instructions to the processor.

The processor 1101 is used to operate the code instructions so as to execute the measurement configuration processing methods of some examples above.

In some examples, the chip 1100 may further include a memory 1102, and the memory 1102 is used to store necessary computer programs and data.

Those skilled in the art may understand that various illustrative logical blocks and steps listed in the examples of the disclosure may be implemented through electronic hardware, computer software, or a combination of the two. Whether these functions implemented through hardware or software depends on specific applications and design requirements of the entire system. Those skilled in the art may use various methods to implement functions for each specific application, but this implementation will not be understood as exceeding the protection scope of the examples of the disclosure.

An example of the disclosure further provides a communication system, the system includes a communication apparatus as a terminal device and a communication apparatus as a network-side device in the example above-mentioned in FIG. 8, or, the system includes a communication apparatus as a terminal device and a communication apparatus as a network-side device in the example above-mentioned in FIG. 9.

The disclosure further provides a readable storage medium, on which instructions are stored, and the instructions, when executed by a computer, implement functions of any method example above.

The disclosure further provides a computer program product, and the computer program product, when executed by a computer, implements functions of any method example above.

In the above example, it may be implemented all or partially through software, hardware, firmware or other any combination. When it is implemented by using software, it may be implemented in a form of a computer program product all or partially. The computer program product includes one or more computer programs. When the computer program is loaded and executed on a computer, flows or functions according to the example of the disclosure are generated all or partially. The computer may be a general-purpose computer, a dedicated computer, a computer network, or other programmable apparatuses. The computer program may be stored in a computer readable storage medium, or is transmitted from one computer readable storage medium to another computer readable storage medium, for example, the computer program may be transmitted from one website station, a computer, a server or a data center to another website station, a computer, a server or a data center through a wired (for example, a coaxial-cable, an optical, a digital subscriber line (DSL)) or wireless (for example, infrared, wireless, microwave, etc.) manner. The computer readable storage medium may be any available media capable of being accessed by the computer or a server, a data center and other data storage devices containing one or more available medium integrations. The available media may be a magnetic medium (for example, a floppy disk, a hard disk, and a magnetic tape), a light medium (for example, a high-density digital video disc (DVD)) or a semiconductor medium (for example, a solid state disk (SSD)).

In a first aspect, an example of the disclosure provides a measurement configuration processing method. The method is performed by a terminal device, and includes receiving measurement configuration information sent by a network-side device, where the measurement configuration information includes a quantity configuration; determining a target access technology corresponding to the quantity configuration and a target measurement index identifier corresponding to the target access technology; and deleting stored report information corresponding to the target measurement index identifier, and/or stopping the running of a report timer corresponding to the target measurement index identifier.

In the technical solution, the measurement configuration information sent by the network-side device is received by the terminal device, where the measurement configuration information includes the quantity configuration; the target access technology corresponding to the quantity configuration and the target measurement index identifier corresponding to the target access technology are determined; and the stored report information corresponding to the target measurement index identifier is deleted, and/or the running of the report timer corresponding to the target measurement index identifier is stopped. Thus, the processing complexity of measurement configuration may be reduced, the terminal device merely needs to re-measure and report the target access technology corresponding to the quantity configuration, waste of radio resources may be avoided, and the delay can be prevented from occurring when performing measurement report on the cell of the access technology, which is not reconfigured, among the plurality of access technologies supported by the terminal device.

In a second aspect, an example of the disclosure provides another measurement configuration processing method. The method is performed by a network-side device, and includes sending measurement configuration information to a terminal device, where the measurement configuration information includes a quantity configuration, the quantity configuration is used to determine a target measurement index identifier corresponding to a target access technology, and the target measurement index identifier is used to determine deleted stored report information and/or a running-stopped report timer.

In a third aspect, an example of the disclosure provides a communication apparatus. The communication apparatus has part or all functions of a terminal device implementing the above method in the first aspect, for example, the functions of the communication apparatus may have functions of part or all examples of the disclosure, and may also have functions of separately implementing any of the examples of the disclosure. The functions may be implemented through hardware, and may also be implemented through corresponding software executed by hardware. The hardware or software includes one or more units or modules corresponding to the above functions.

In an implementation, a structure of the communication apparatus may include a transceiving module and a processing module, and the processing module is configured to support the communication apparatus to execute corresponding functions of the above method. The transceiving module is configured to support communications between the communication apparatus and other devices. The communication apparatus may further include a storage module, and the storage module is configured to couple with the transceiving module and the processing module, and store necessary computer programs and data of the communication apparatus.

As an example, the processing module may be a processor, the transceiving module may be a transceiver or a communication interface, and the storage module may be a memory.

In an implementation, the communication apparatus includes: a transceiving module, configured to receive measurement configuration information sent by a network-side device, where the measurement configuration information includes a quantity configuration; and a processing module, configured to determine a target access technology corresponding to the quantity configuration and a target measurement index identifier corresponding to the target access technology; and delete stored report information corresponding to the target measurement index identifier, and/or stop the running of a report timer corresponding to the target measurement index identifier.

In a fourth aspect, an example of the disclosure provides another communication apparatus. The communication apparatus has part or all functions of a network device implementing the above method example in the second aspect, for example, the functions of the communication apparatus may have functions of part or all examples of the disclosure, and may also have functions of separately implementing any of the examples of the disclosure. The functions may be implemented through hardware, and may also be implemented through corresponding software executed by hardware. The hardware or software includes one or more units or modules corresponding to the above functions.

In an implementation, a structure of the communication apparatus may include a transceiving module and a processing module, and the processing module is configured to support the communication apparatus to execute the corresponding functions of the above method. The transceiving module is configured to support communications between the communication apparatus and other devices. The communication apparatus may further include a storage module, and the storage module is configured to couple with the transceiving module and the processing module, and store necessary computer programs and data of the communication apparatus.

In an implementation, the communication apparatus includes: a transceiving module, configured to send measurement configuration information to a terminal device, where the measurement configuration information includes a quantity configuration, the quantity configuration is used to determine a target measurement index identifier corresponding to a target access technology, and the target measurement index identifier is used to determine deleted stored report information and/or a running-stopped report timer.

In a fifth aspect, an example of the disclosure provides a communication apparatus. The communication apparatus includes a processor, and when invoking a computer program in a memory, the processor executes the above method in the first aspect.

In a sixth aspect, an example of the disclosure provides a communication apparatus. The communication apparatus includes a processor, and when invoking a computer program in a memory, the processor executes the above method in the second aspect.

In a seventh aspect, an example of the disclosure provides a communication apparatus. The communication apparatus includes a processor and a memory, and a computer program is stored in the memory; and the processor executes the computer program stored in the memory, causing that the communication apparatus executes the above method in the first aspect.

In an eighth aspect, an example of the disclosure provides a communication apparatus. The communication apparatus includes a processor and a memory, and a computer program is stored in the memory; and the processor executes the computer program stored in the memory, causing that the communication apparatus executes the above method in the second aspect.

In a ninth aspect, an example of the disclosure provides a communication apparatus. The communication apparatus includes a processor and an interface circuit, the interface circuit is configured to receive a code instruction and transmit the code instruction to the processor, and the processor is configured to run the code instruction, causing that the apparatus executes the above method in the first aspect.

In a tenth aspect, an example of the disclosure provides a communication apparatus. The communication apparatus includes a processor and an interface circuit, the interface circuit is configured to receive a code instruction and transmit the code instruction to the processor, and the processor is configured to run the code instruction, causing that the apparatus executes the above method in the second aspect.

In an eleventh aspect, an example of the disclosure provides a communication system. The system includes the communication apparatus in the third aspect and the communication apparatus in the fourth aspect, or, the system includes the communication apparatus in the fifth aspect and the communication apparatus in the sixth aspect, or the system includes the communication apparatus in the seventh aspect and the communication apparatus in the eighth aspect, or the system includes the communication apparatus in the ninth aspect and the communication apparatus in the tenth aspect.

In a twelfth aspect, an example of the disclosure provides a non-transitory computer readable storage medium, for storing instructions used by a terminal device, and when the instructions are executed, the terminal device executes the method in the first aspect.

In a thirteenth aspect, an example of the disclosure provides a non-transitory computer readable storage medium, for storing instructions used by a network-side device, and when the instructions are executed, the network-side device executes the method in the second aspect.

In a fourteenth aspect, the disclosure further provides a computer program product including a computer program, and when the computer program runs on a computer, the computer executes the method in the first aspect.

In a fifteenth aspect, the disclosure further provides a computer program product including a computer program, and when the computer program runs on a computer, the computer executes the method in the second aspect.

In a sixteenth aspect, the disclosure further provides a chip system. The chip system includes at least one processor and an interface, for supporting a terminal device to implement functions involved in the first aspect, for example, determining or processing at least one of data and information involved in the above method. In a possible design, the chip system further includes a memory, and the memory is used to store necessary computer programs and data of the terminal device. The chip system may be composed of chips, and may also include a chip and other discrete devices.

In a seventeenth aspect, the disclosure provides a chip system. The chip system includes at least one processor and an interface, for supporting a network-side device to implement functions involved in the second aspect, for example, determining or processing at least one of data and information involved in the above method. In a possible design, the chip system further includes a memory, and the memory is used to store necessary computer programs and data of the network-side device. The chip system may be composed of chips, and may also include a chip and other discrete devices.

In an eighteenth aspect, the disclosure provides a computer program, and when the computer program runs on a computer, the computer executes the method in the first aspect.

In a nineteenth aspect, the disclosure provides a computer program, and when the computer program runs on a computer, the computer executes the method in the second aspect.

Those ordinarily skilled in the art may understand that various numerical numbers involved in the disclosure are merely distributed for ease of description, do not used to limit the scope of the example of the disclosure, and also indicate a sequential order.

"At least one" in the disclosure may be described as one or more, more may be two, three, four or more, which is not limited in the disclosure. In the example of the disclosure, for one technical feature, technical features in the technical feature are distinguished through "first", "second", "third", "A", "B", "C" and "D", and the technical features described through the "first", "second", "third", "A", "B", "C" and "D" have no sequential order or size order.

The corresponding relationship shown in each table may be configured, and may also be predefined. Values of information in each table are merely illustrative, and may be configured as other values, which is not limited to the disclosure. When a corresponding relationship between the information and each parameter is configured, all corresponding relationships shown in each table are not necessarily required to be configured. For example, in forms of the disclosure, corresponding relationships shown in certain rows may also not be configured. For another, appropriate deformation adjustments may be made based on the above forms, for example, splitting, merging, etc. Names of parameters shown in titles in each table may also adopt other names capable of understood by the communication apparatus, and value or indicating manners of the parameters may also be other value or indicating manners capable of understood by the communication apparatus. When the above tables are implemented, other data structures may also be adopted, for example, an array, a queue, a container, a stack, a linear list, a pointer, a linked list, a tree, a diagram, a structural body, a category, a hash table, etc. may be adopted.

Predefinition in the disclosure may be understood as definition, preliminary definition, storage, pre-storage, pre-negotiation, pre-configuration, solidification, or prefiring.

Those ordinarily skilled in the art may realize that by combining with units and algorithm steps of examples described in the examples of the disclosure, it may be implemented through electronic hardware, or a combination of computer software and electronic hardware. Whether these functions executed through a manner of hardware of software depends on specific application and design constraint conditions of the technical solution. Professionals may use different methods to implement the described functions for each specific function, but this implementation is not considered as exceeding the scope of the disclosure.

Those skilled in the art may know that for convenience and concision of descriptions, a specific working process of the above described system, apparatus and unit may refer to corresponding processes in the above-mentioned method example, which is not repeated here.

What is said above is merely the specific implementation of the disclosure, but the protection scope of the disclosure is not limited to this, any technical personnel familiar with the technical field within the technical scope disclosed in the disclosure may easily thick of changes or replacements, which may be covered in the protection scope of the disclosure. Thus, the protection scope of the disclosure is governed by the protection scope of claims.

The invention claimed is:

1. A measurement configuration processing method, performed by a terminal device, comprising:

receiving measurement configuration information sent by a network-side device, wherein the measurement configuration information comprises a quantity configuration;

determining a target access technology corresponding to the quantity configuration and a target measurement index identifier corresponding to the target access technology; and performing at least one of the following: deleting stored report information corresponding to the target measurement index identifier, or stopping a running of a report timer corresponding to the target measurement index identifier;

wherein determining the target measurement index identifier corresponding to the target access technology comprises: determining the target measurement index identifier corresponding to the target access technology according to a corresponding relationship between an access technology and a measurement index identifier; wherein the corresponding relationship between the access technology and the measurement index identifier comprises: an access technology of a measurement object corresponding to the measurement index identifier; an access technology of a report configuration corresponding to the measurement index identifier; or a corresponding relationship sent by the network-side device between an access technology and the measurement index identifier;

wherein the method further comprises:

on a condition that the corresponding relationship between the access technology and the measurement index identifier comprises the corresponding relationship sent by the network-side device between the access technology and the measurement index identifier, receiving a list sent by the network-side device, wherein the list comprises at least one measurement index identifier, or comprise a measurement index identifier corresponding to at least one access technology, wherein the at least one access technology comprises the target access technology;

wherein determining the target measurement index identifier corresponding to the target access technology further comprises:

determining the target measurement index identifier corresponding to the target access technology in the list; and wherein deleting the stored report information corresponding to the target measurement index identifier comprises:

deleting the stored report information corresponding to the target measurement index identifier in the list.

2. The measurement configuration processing method according to claim 1, wherein determining the target measurement index identifier corresponding to the target access technology further comprises:

on a condition that the corresponding relationship between the access technology and the measurement index identifier comprises the access technology of the measurement object corresponding to the measurement index identifier, determining a measurement object corresponding to the target access technology according to the corresponding relationship between the measurement index identifier and the access technology of the measurement object stored, and determining the target measurement index identifier corresponding to the target access technology.

3. The measurement configuration processing method according to claim 1, wherein determining the target measurement index identifier corresponding to the target access technology further comprises:

on a condition that the corresponding relationship between the access technology and the measurement index identifier comprises the access technology of the report configuration corresponding to the measurement index identifier, determining a report configuration corresponding to the target access technology according to the corresponding relationship between the measurement index identifier and the access technology of the report configuration stored, and determining the target measurement index identifier corresponding to the target access technology.

4. The measurement configuration processing method according to claim 1, wherein the measurement configuration processing method further comprises:

on a condition that the corresponding relationship between the access technology and the measurement index identifier comprises a corresponding relationship sent by the network-side device between the access technology and the measurement index identifier, receiving the list sent by the network-side device, wherein the list comprises all measurement index identifiers configured by the terminal device and the access technology corresponding to each measurement index identifier.

5. The measurement configuration processing method according to claim 1, wherein the measurement configuration information comprises at least one of: a measurement object, a report configuration, or a measurement index identifier.

6. The measurement configuration processing method according to claim 1, wherein the corresponding relationship between an access technology and a measurement index identifier is obtained through at least one of:

configuring by the network-side device;

determining through communication protocol stipulation, or obtaining from other terminal devices.

7. A measurement configuration processing method, performed by a network-side device, comprising:

sending measurement configuration information to a terminal device, wherein the measurement configuration information comprises a quantity configuration, the quantity configuration is used to determine a target measurement index identifier corresponding to a target access technology, and the target measurement index identifier is used to determine at least one of: deleted stored report information or a running-stopped report timer;

wherein determining the target measurement index identifier corresponding to the target access technology comprises: determining the target measurement index identifier corresponding to the target access technology according to a corresponding relationship between an access technology and a measurement index identifier; wherein the corresponding relationship between the access technology and the measurement index identifier comprises: an access technology of a measurement object corresponding to the measurement index identifier; an access technology of a report configuration corresponding to the measurement index identifier; or a corresponding relationship sent to the terminal device between an access technology and the measurement index identifier;

wherein the method further comprises:

on a condition that the corresponding relationship between the access technology and the measurement index identifier comprises the corresponding relationship sent by the network-side device between the access technology and the measurement index identifier, sending a list to the terminal device, wherein the list comprises at least one measurement index identifier, or comprise a measurement index identifier corresponding to at least one access technology, wherein the at least one access technology comprises a target access technology;

wherein the quantity configuration is further used to determine the target measurement index identifier corresponding to the target access technology in the list; and wherein the target measurement index identifier is further used to determine the deleted stored report information corresponding to the target measurement index identifier in the list.

8. The measurement configuration processing method according to claim 7, wherein the measurement configuration information comprises at least one of: a measurement object, a report configuration, or a measurement index identifier.

9. A communication apparatus, comprising a processor and a memory, and a computer program stored on the memory and capable of being run by the processor, wherein the processor is configured to:

receive measurement configuration information sent by a network-side device, wherein the measurement configuration information comprises a quantity configuration;

determine a target access technology corresponding to the quantity configuration and a target measurement index identifier corresponding to the target access technology; and perform at least one of: deleting stored report information corresponding to the target measurement index identifier, or stopping the running of a report timer corresponding to the target measurement index identifier;

wherein the processor is further configured to:

determine the target measurement index identifier corresponding to the target access technology according to a corresponding relationship between an access technology and a measurement index identifier; wherein the corresponding relationship between the access technology and the measurement index identifier comprises: an access technology of a measurement object corresponding to the measurement index identifier; an access technology of a report configuration corresponding to the measurement index identifier; or a corresponding relationship sent by the network-side device between an access technology and the measurement index identifier;

wherein the processor is further configured to:

on a condition that the corresponding relationship between the access technology and the measurement index identifier comprises the corresponding relationship sent by the network-side device between the access technology and the measurement index identifier, receive a list sent by the network-side device, wherein the list comprises at least one measurement index identifier, or comprise a measurement index identifier corresponding to at least one access technology, wherein the at least one access technology comprises the target access technology;

wherein the processor is further configured to:

determine the target measurement index identifier corresponding to the target access technology in the list; and wherein the processor is further configured to:

delete the stored report information corresponding to the target measurement index identifier in the list.

* * * * *